United States Patent [19]

VanGinhoven

[11] Patent Number: 4,781,291

[45] Date of Patent: Nov. 1, 1988

[54] NETTING FOR WRAPPING ROUND BALES

[75] Inventor: Robert M. VanGinhoven, Lancaster, Pa.

[73] Assignee: New Holland Inc., New Holland, Pa.

[21] Appl. No.: 88,456

[22] Filed: Aug. 24, 1987

[51] Int. Cl.⁴ .............................................. B65D 71/00
[52] U.S. Cl. ................................ 206/83.5; 150/52 R
[58] Field of Search ............... 428/105, 107, 108, 231, 428/910; 206/83.5, 442; 150/52 R

[56] References Cited

U.S. PATENT DOCUMENTS

| | | | |
|---|---|---|---|
| 4,152,479 | 5/1979 | Larsen | 428/224 |
| 4,208,457 | 6/1980 | Kelly et al. | 428/107 |
| 4,409,784 | 10/1983 | VanGinhoven et al. | 56/341 |
| 4,517,890 | 5/1985 | Campbell et al. | 100/5 |
| 4,569,439 | 2/1986 | Freye et al. | 206/83.5 |
| 4,570,789 | 2/1986 | Fritz et al. | 206/410 |
| 4,604,848 | 8/1986 | Clostermeyer | 53/118 |
| 4,604,855 | 8/1986 | Krone et al. | 53/64 |
| 4,677,807 | 7/1987 | Verhulst et al. | 53/118 |

*Primary Examiner*—James J. Bell
*Attorney, Agent, or Firm*—Darrell F. Marquette; Frank A. Seemar; Larry W. Miller

[57] ABSTRACT

Netting in the form of an extruded plastic mesh is provided for wrapping round bales of crop material. The netting includes longitudinal strands and tranverse strands fused together at intersecting joints to define rectangularly shaped openings in the netting. The minimum elasticity of the netting is about 15% before tensile failure in a longitudinal direction in order to prevent the netting from shrinking in a transverse direction. The netting thus maintains its original width dimension when pulled lengthwise.

7 Claims, 1 Drawing Sheet

NETTING FOR WRAPPING ROUND BALES

BACKGROUND AND SUMMARY OF THE INVENTION

This invention relates to an improved netting for wrapping round bales of crop material.

Twine and plastic film are well known expedients used to wrap round bales. U.S. Pat. No. 4,517,890 discloses such use of twine, and U.S. Pat. No. 4,409,784 discloses this use of plastic film. In addition, netting made of raschel fabric has been used for round bale wrapping as disclosed in U.S. Pat. Nos. 4,569,439 and 4,570,789. This type of netting is a warp knit material of coarse texture. Although raschel fabric netting has several advantages over twine and plastic film, it also has two significant disadvantages. One of these disadvantages is that raschel fabric netting is very difficult to cut. The other disadvantage of raschel fabric netting is that it shrinks in overall width when pulled lengthwise.

Therefore, it is an object of the present invention to provide an improved netting for wrapping round bales of crop material which is easy to cut and which maintains its original, width dimension when pulled longitudinally.

The present invention provides netting for wrapping a round bale of crop material. The netting is preferably a plastic mesh including a plurality of longitudinal strands extending in a longitudinal direction and a plurality of transverse strands extending in a transverse direction. The longitudinal and transverse strands are connected together at a plurality of intersecting joints to define a plurality of rectangularly shaped openings in the netting. The netting has a minimum elasticity of about 15% in the longitudinal direction before tensile failure. This minimum elasticity prevents the netting from shrinking in the transverse direction when it is pulled in the longitudinal direction. The netting is preferably an extruded plastic mesh formed of polyethylene or polypropylene.

DESCRIPTION OF THE PREFERRED EMBODIMENT

Figure 1:
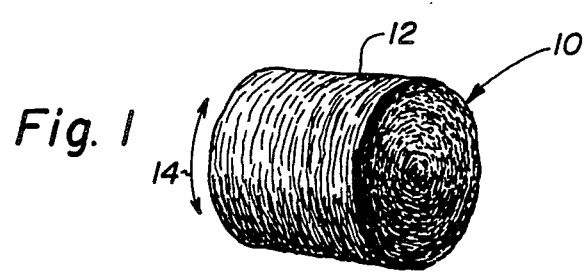
FIG. 1 is a perspective view of a round bale of crop material.

Referring to FIG. 1, a round bale 10 of crop material is illustrated. The round bale 10 is preferably formed of spirally wrapped layers of agricultural crops such as hay or straw. In order to hold the round bale 10 together after being formed, its outer surface 12 may be wrapped with twine, plastic film or netting in a circumferential direction 14.

Figure 2:
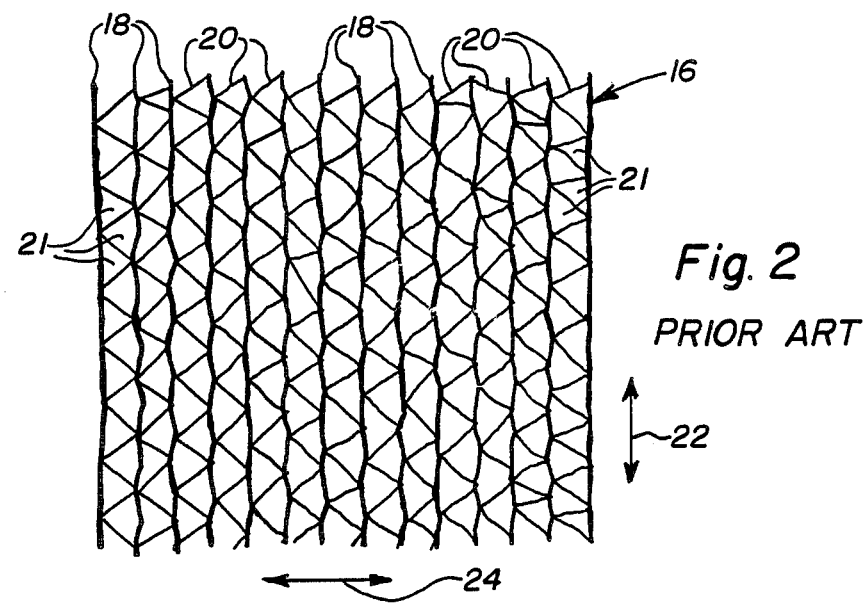
FIG. 2 is a plan view of a section of prior art netting.

Prior art netting 16 shown in FIG. 2 is formed of raschel fabric which is a warp knit material of coarse texture. Netting 16 includes prestretched longitudinal strands 18 and transverse strands 20 loosely woven between the strands 18 to define a plurality of irregular triangularly shaped openings 21 in netting 16. This arrangement of longitudinal strands 18 and transverse strands 20 causes netting 16 to be substantially inextensible or unstretchable in its longitudinal direction 22 while being extensible or stretchable in its transverse direction 24. U.S. Pat. Nos. 4,569,439 and 4,570,789 disclose raschel fabric netting with these characteristics. One problem encountered with using netting 16 to wrap round bale 10 is that netting 16 is difficult to cut due to the number and orientation of the transverse strands 20. Another problem with the use of netting 16 for wrapping round bale 10 is that netting 16 shrinks in its transverse direction 24 and fails to maintain its original width dimension when pulled in longitudinal direction 22, thereby leaving parts of the outer surface 12 of the round bale 10 unwrapped.

Figure 3:
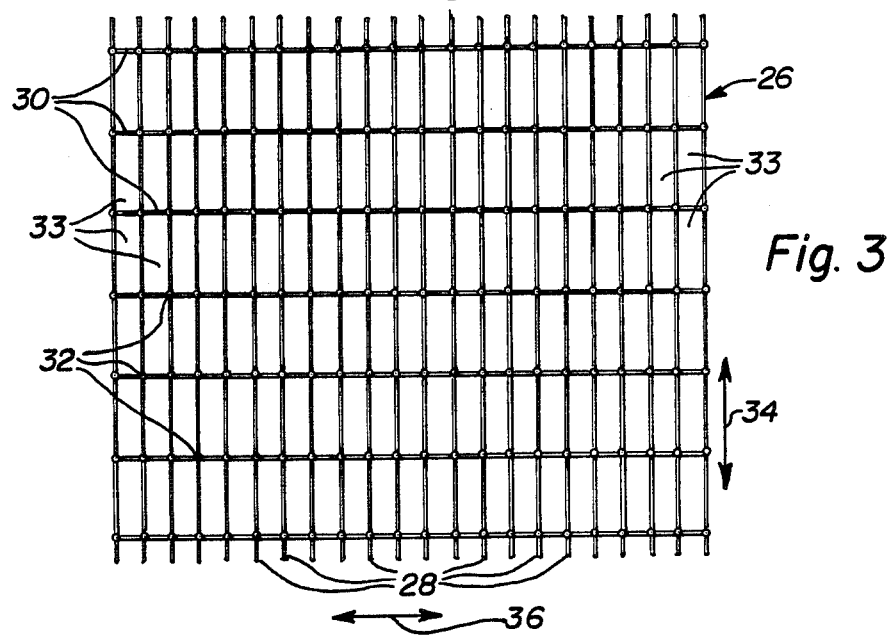
FIG. 3 is a plan view of a section of improved netting according to the preferred embodiment of the present invention.

Improved netting 26 according to the preferred embodiment of the present invention is shown in FIG. 3. Netting 26 is preferably an extruded plastic mesh formed of polyethylene or polypropylene which includes a plurality of longitudinal strands 28 and a plurality of transverse strands 30 arranged substantially perpendicular to each other and fused together at a plurality of intersecting joints 32 to define a plurality of rectangularly shaped openings 33 in netting 26. U.S. Pat. No. 4,152,479 discloses one type of extruded plastic mesh netting. Although the longitudinal and transverse strands 28 and 30, respectively, of improved netting 26 are stretched when the netting is manufactured, netting 26 must have a minimum elasticity of about 15% before tensile failure in a longitudinal direction 34. The tensile strength of netting 26 in the longitudinal direction 34 will preferably be in the range of 6 to 7 pounds per inch of width. Accordingly, a section of netting 26 that is 50 inches wide would have a tensile strength of 300 to 350 pounds in longitudinal direction 34.

When netting 26 is wrapped in circumferential direction 14 around the outer surface 12 of round bale 10, it is pulled in longitudinal direction 34 but the elasticity in that direction prevents netting 26 from shrinking in a transverse direction 36. Therefore, the netting 26 maintains its original width dimension so that the entire outer surface 12 of round bale 10 is wrapped with netting 26 and no parts of the bale outer surface 12 are left unwrapped. When it is desired to cut off netting 26 after the round bale 10 has been wrapped, the longitudinal strands 28 are easily severed intermediate a pair of transverse strands 30.

It will be understood that when round bale 10 is wrapped with netting 26, the longitudinal strands 28 extend circumferentially of the round bale 10 and the transverse strands 30 extend longitudinally of the round bale 10. Under normal conditions, it has been found satisfactory to cover the outer surface 12 of round bale 10 with 2 to 4 full circumferential wraps of netting 26. The crop material in the outer surface 12 of round bale 10 pokes through the openings 33 in netting 26 causing netting 26 to cling onto the outer surface 12 of round bale 10. This holds the round bale 10 together without any additional fastening of netting 26.

Various types of apparatus may be used for applying netting 26 to the outer surface 12 of the round bale 10. One such type of apparatus is disclosed in U.S. patent application Ser. No. 45,977 filed May 1, 1987, and entitled "Net Dispenser Drive for Round Balers", incorporated herein by reference. Other types of apparatus are disclosed in U.S. Pat. Nos. 4,604,848; 4,604,855 and 4,677,807.

The present invention thus provides improved netting for wrapping round bales of crop material which is easy to cut and which maintains its original width dimension when pulled lengthwise.

Having thus described the invention, what is claimed is:

1. In combustion with a cylindrically shaped round bale of crop material, netting for wrapping the outer surface of said round bale in a circumferential direction, said netting comprising a plurality of longitudinal strands extending circumferentially of said round bale and a plurality of transverse strands extending longitudinaly of said round bale, said netting having sufficient elasticity in said circumferential direction to thereby prevent said netting from shrinking longitudinally of said round bale when the outer surface of said round bale is wrapped with said netting.

2. In combination with a cylindrically shaped round bale of crop material, netting for wrapping the outer surface of said round bale in a circumferential direction, said netting comprising a plurality of longitudinal strands extending circumferentially of said round bale and a plurality of transverse strands extending longitudinally of said round bale, said longitudinal and transverse strands being arranged substantially perpendicular to each other and being fused together at a plurality of intersecting joints to define a plurality of rectangular openings in said netting so that crop material in the outer surface of said round bale pokes through said plurality of rectangular openings when the outer surface of said round bale is wrapped with said netting to thereby hold said round bale together.

3. The netting of claim 1, wherein said longitudinal and transverse strands are connected together at a plurality of intersecting joints.

4. The netting of claim 3, wherein said netting is an extruded plastic mesh formed of polyethylene.

5. The netting of claim 3, wherein said netting is an extruded plastic mesh formed of polypropylene.

6. The netting of claim 3, wherein said longitudinal and transverse strands define a plurality of rectangularly shaped openings in said netting.

7. The netting of claim 6, wherein said pluralities of longitudinal and transverse strands are arranged substantially perpendicular to each other to define said rectangularly shaped openings.

* * * * *